W. B. & D. H. HARNISH.
Improvement in Machines for Cutting and Grinding Corn Fodder, &c.
No. 118,234. Patented Aug. 22, 1871.
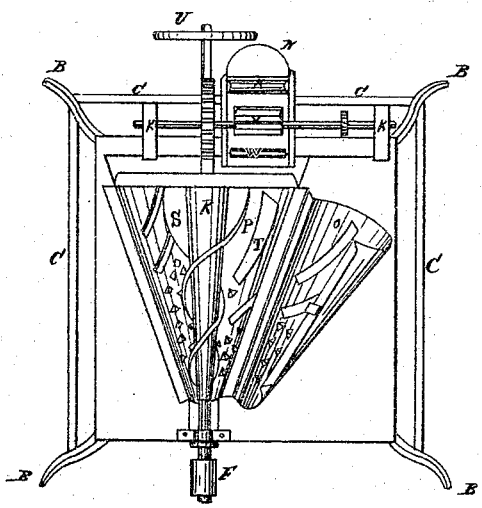
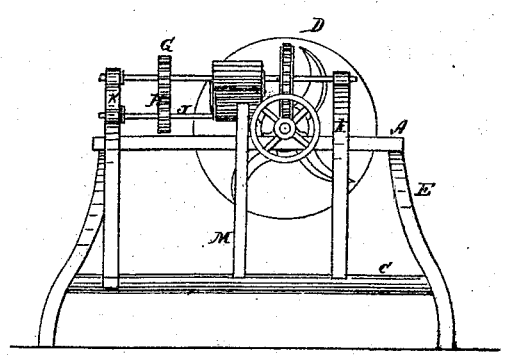
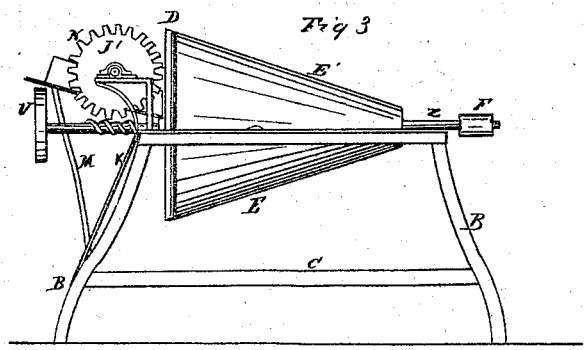

UNITED STATES PATENT OFFICE.

BENJAMIN HARNISH, OF LANCASTER, AND DAVID H. HARNISH, OF PEQUEA, PENNSYLVANIA.

IMPROVEMENT IN MACHINES FOR CUTTING AND GRINDING CORN-FODDER, &c.

Specification forming part of Letters Patent No. 118,234, dated August 22, 1871.

*To all whom it may concern:*

Be it known that we, BENJAMIN HARNISH, of Lancaster, and DAVID H. HARNISH, of Pequea, in the county of Lancaster and State of Pennsylvania, have invented certain Improvements in a Machine for Cutting and Grinding Corn-Fodder and the like, of which the following is a specification:

The object of this invention is to cut corn-fodder with its stalks, and to grind them for feed, in one and the same operation or revolution of the cutters and mill on the same shaft.

The accompanying drawing and letters of reference will enable any one skilled in the art to make and use our invention.

Figure 1 is a top view, with the conic shaft and case, the lid or upper section laid back on the table. Fig. 2 is a view of one end elevation; Fig. 3, side elevation.

The top A forms a flat table. The upper half of the conical shell E of the mill is hinged to the table or lower half. The shaft Z has a portion, R, within the conic concaves, also of a conic form, and is provided with a double-screw crusher and conveyers combined. Both portions of the shell O P have also long curved flange-like teeth T, besides pointed triangular teeth, arranged substantially like in other iron conic mills. The main shaft Z has a strap-pulley, F, to apply the power; and while it performs the grinding by the flanged and toothed enlargement R, it also bears a disk, D, with knives similar to the arrangement we use on our vegetable cutter, for which application for Letters Patent is also herewith made. Said shaft terminates with a fly-wheel, U, as in numerous cases. There is also an endless screw-gear on the main shaft Z, which imparts motion to a cogged wheel, J', on the shaft I, which has its bearings in side brackets K L. This shaft passes over the feed-box N and propels a winged feed-roller, V, to work the fodder forward to the cutters. There are also friction-rollers, X W, across the feed-box N, to aid in propelling the material forward. Besides, the shaft I aforesaid has a pinion, G, which gives motion to a like pinion, H, directly under it on a shaft, J, which operates a feed-roller, Y, partly in and partly under the feed-box, acting in concert with the upper flanged or winged feed-roller V. The feed-box N is open on the outer end, of any desired size or length, into which the corn-stalks and fodder are thrust, between the rollers, and fed forward to the revolving disk, with its sickles or cutters adjusted to the desired coarseness or quality to be cut, which drops into the conic shell and is subjected to the crushing and grinding process of the mill. Fed forward by the screw flanged on the shaft to the narrow end of the cone, gradually reduced until sufficiently fine, it is discharged through the open end into a vessel or drawer provided for its reception. B shows the supporting-legs; C, the lower cross-pieces; M, the end support of the feed-box N; K L, the prolonged bearings.

The cutting-disk D, which bears the knives and adjustable inner disk and set-screw, is made on the same plan as described in our vegetable cutter, and, not being specially claimed apart from the arrangement, we do not claim it specially, although, to the best of our knowledge, the double-disk and set-screw arrangement may be new in its combination. Aware, however, that knives on revolving disks are not new, as well as conic shells for grinding purposes, as well as the gearing, therefore we do not claim any of the parts employed, when separately considered; but we are not aware that a horizontal conic mill with a cutting-disk or combined disks were ever before arranged and operated in the manner and for the purpose herein specified; therefore,

What we claim, and desire to secure by Letters Patent, is—

In combination with the conical mill, composed of the shell E and grinding-shaft R, the cutting-disk D, feed-box N, winged feed-roller V, and gearing, all arranged and operating substantially as herein set forth.

B. HARNISH.
      DAVID H. HARNISH.

Witnesses:
 JACOB STAUFFER,
 HENRY C. STAUFFER.